(12) United States Patent
Kamon et al.

(10) Patent No.: US 12,459,132 B2
(45) Date of Patent: Nov. 4, 2025

(54) REMOTE CONTROL DEVICE

(71) Applicant: KAWASAKI JUKOGYO KABUSHIKI KAISHA, Kobe (JP)

(72) Inventors: Masayuki Kamon, Kobe (JP); Kenji Kitani, Kobe (JP); Tomoki Oka, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 452 days.

(21) Appl. No.: 17/784,198

(22) PCT Filed: Nov. 24, 2020

(86) PCT No.: PCT/JP2020/043576
§ 371 (c)(1),
(2) Date: Jun. 10, 2022

(87) PCT Pub. No.: WO2021/117473
PCT Pub. Date: Jun. 17, 2021

(65) Prior Publication Data
US 2023/0034130 A1 Feb. 2, 2023

(30) Foreign Application Priority Data
Dec. 13, 2019 (JP) ................................. 2019-225694

(51) Int. Cl.
*B25J 13/02* (2006.01)
*B25J 19/00* (2006.01)
(52) U.S. Cl.
CPC ......... *B25J 13/025* (2013.01); *B25J 19/0016* (2013.01)

(58) Field of Classification Search
CPC ....... B25J 13/00; B25J 13/025; B25J 19/0016
See application file for complete search history.

(56) References Cited

U.S. PATENT DOCUMENTS 4,546,233 A * 10/1985 Yasuoka .............. B25J 19/0016
901/42
5,828,813 A * 10/1998 Ohm .......................... B25J 3/04
700/260

(Continued)

FOREIGN PATENT DOCUMENTS

FR 2910833 A1 7/2008
JP 2013-049121 A 3/2013

(Continued)

OTHER PUBLICATIONS

English translation of JP 2013049121 A (Year: 2013).*

*Primary Examiner* — Joseph Brown
(74) *Attorney, Agent, or Firm* — METROLEX IP LAW GROUP, PLLC; Robert L. Scott, Esq.

(57) ABSTRACT

A remote control device includes: a first arm; a second arm connected to a tip-end part of the first arm; two rotary bodies disposed at a tip of the second arm; a link structure including link members fixed to the two rotary bodies; and a user interface attached to the link structure. The two rotary bodies are independently and rotatably supported by respective coaxial drive shafts. The user interface is pivotable, with respect to the second arm, on each of mutually-perpendicular three axes passing through a center point of the link structure. The link structure is disposed at the lateral side of the rotary bodies so that the center point is located on an axis of the two drive shafts. The user interface is attached to the link structure on an axis of a rotation shaft passing through the center point.

9 Claims, 8 Drawing Sheets

(56) References Cited

U.S. PATENT DOCUMENTS

| 2012/0234126 A1* | 9/2012 | Gosselin | ............... | B25J 13/025 |
| | | | | 74/490.14 |
| 2014/0020507 A1* | 1/2014 | Sasaki | .................... | F16H 21/44 |
| | | | | 74/99 R |
| 2020/0298393 A1 | 9/2020 | Kamon et al. | | |

FOREIGN PATENT DOCUMENTS

| JP | 2013-088852 A | 5/2013 |
| JP | 2017-064892 A | 4/2017 |
| JP | 2019-093502 A | 6/2019 |

* cited by examiner

REMOTE CONTROL DEVICE

CROSS-REFERENCE TO RELATED APPLICATIONS

This application is a national stage entry of International Application No. PCT/JP2020/043576 filed on Nov. 24, 2020, which claims priority based on the Article 8 of Patent Cooperation Treaty from prior Japanese Patent Application No. 2019-225694, filed on Dec. 13, 2019, the entire contents of all of which are incorporated herein by reference.

TECHNICAL FIELD

The present disclosure relates to a remote control device for a remote control of an articulated robot etc.

BACKGROUND ART

Conventionally, a robot or machinery, which is used in a place where people are difficult to enter etc., may be remotely controlled. Although there are various types of control devices for remotely controlling the robot or machinery, recently, some control devices carry out a force-sense control of the control device (master) and the robot (slave) using a bilateral method. Hereinafter, "the force-sense control by the bilateral method" may also be referred to as "the bilateral control."

The control device which performs the bilateral control needs to carry out a force-sense feedback of a kinesthetic sense which acts on the robot or machinery to a user, and there are some control devices provided with a plurality of actuators. Some control devices use motors as the actuators.

As this kind of conventional art, for example, there is a remote control device in which a user can perform the control while placing his/her elbows with his/her wrists so that he/she does not get tired even if he/she uses the device for a long period of time (for example, see Patent Document 1). With this remote control device, the user can perform the remote control by holding interface parts (grips) and tilting coupling members coupled to armrest members, and the force-sense feedback to the user is performed by motors provided inside the coupling members.

Further, as another conventional art, a manipulator drive unit which operates a manipulator is fixed to a bracket of a spherical surface parallel link, and the spherical surface parallel link is driven by a link drive unit (for example, see Patent Document 2). In this conventional art, the remote center at which the manipulator is operated is acquired by the link drive unit of the spherical surface parallel link.

Reference Document(s) of Conventional Art

Patent Documents

[Patent Document 1] JP2013-088852A
[Patent Document 2] JP2017-064892A

DESCRIPTION OF THE DISCLOSURE

Problem(s) to be Solved by the Disclosure

However, since Patent Document 1 described above is the remote control device which is operated while the operator places the elbows including the wrists, the structure will be complicated if the operating range of the user interface is expanded to expand the operating range of the robot. In addition, since the places at which the operator puts the elbows are limited, the robot and machinery to be remotely controlled are limited.

Further, in Patent Document 2 described above, although the remote center for driving the manipulator can be acquired by the link drive unit of the spherical surface parallel link, the operating range of the user interface cannot be expanded, thereby limiting the robot and machinery to be remotely controlled. In addition, it is difficult to provide the configuration for making the force-sense feedback in the case of performing the bilateral control act on the user interface.

Thus, one purpose of the present disclosure is to provide a remote control device, capable of reducing the size of a configuration around a user interface, and obtaining the expanded operating range.

Means for Solving the Problem

In order to achieve the purpose, the present disclosure includes a first arm supported by a base part, a second arm connected to a tip-end part of the first arm, two rotary bodies disposed side by side at a tip-end part of the second arm, a link structure in which link members are fixed to the two rotary bodies, respectively, and a user interface attached to the link structure. The two rotary bodies are independently and rotatably supported by respective coaxial drive shafts disposed horizontally. The user interface is pivotable with respect to the second arm on each of mutually-perpendicular three axes passing through a center point of the link structure. The link structure is disposed at the lateral side of the rotary bodies so that the center point is located on an axis of the two drive shafts. The user interface is attached to the link structure on an axis of a rotation shaft passing through the center point. The "link structure" in the documents of the present specification and the claims refers to one including the plurality of link members each of which moves independently with respect to the center point of the three axes. The three axes are three axes of a pitch axis, a roll axis, and a yaw axis.

According to this configuration, since the user interface is attached to the link structure which is disposed at the lateral side of the two rotary bodies disposed side by side at the tip-end part of the second arm and on the axis of the drive shafts of the rotary bodies, the user interface can be operated within a large operating range. In addition, since the user interface is disposed at the link structure disposed at the lateral side of the rotary bodies, the size of the configuration around the user interface can be reduced.

Effect of the Disclosure

According to the present disclosure, a remote control device which is capable of reducing the size of a configuration around a user interface, and obtaining the expanded operating range, can be provided.

BRIEF DESCRIPTION OF DRAWINGS

FIG. 6(A) is a perspective view of a state where it is leaned forward, and FIG. 6(B) is a perspective view of a state where it is leaned rearward.

FIG. 7(A) is a perspective view of a state where it is leaned leftward, and FIG. 7(B) is a perspective view of a state where it is leaned rightward.

MODES FOR CARRYING OUT THE DISCLOSURE

Hereinafter, one embodiment is described based on the drawings. In the following embodiment, a remote control device 1 in which a user interface 30 is operated with a single hand is described as an example. Further, in the following description, a case where an articulated robot (not illustrated) is remotely controlled by the remote control device 1 is described as an example.

The remote control device 1 and the articulated robot (hereinafter, simply referred to as "the robot") are force-sense controlled by a bilateral method (bilaterally controlled). Since the bilateral control can utilize a known method, detailed description thereof is omitted. Further, in this embodiment, a motor (for example, a servomotor) as an actuator which makes a force-sense feedback act on the user interface 30 is described as an example. The concept of front and rear, and left and right directions in the documents of the present specification and the claims is in agreement with the concept of front and rear, and left and right directions illustrated in FIG. 1.

(Entire Configuration of Remote Control Device)

Figure 1:
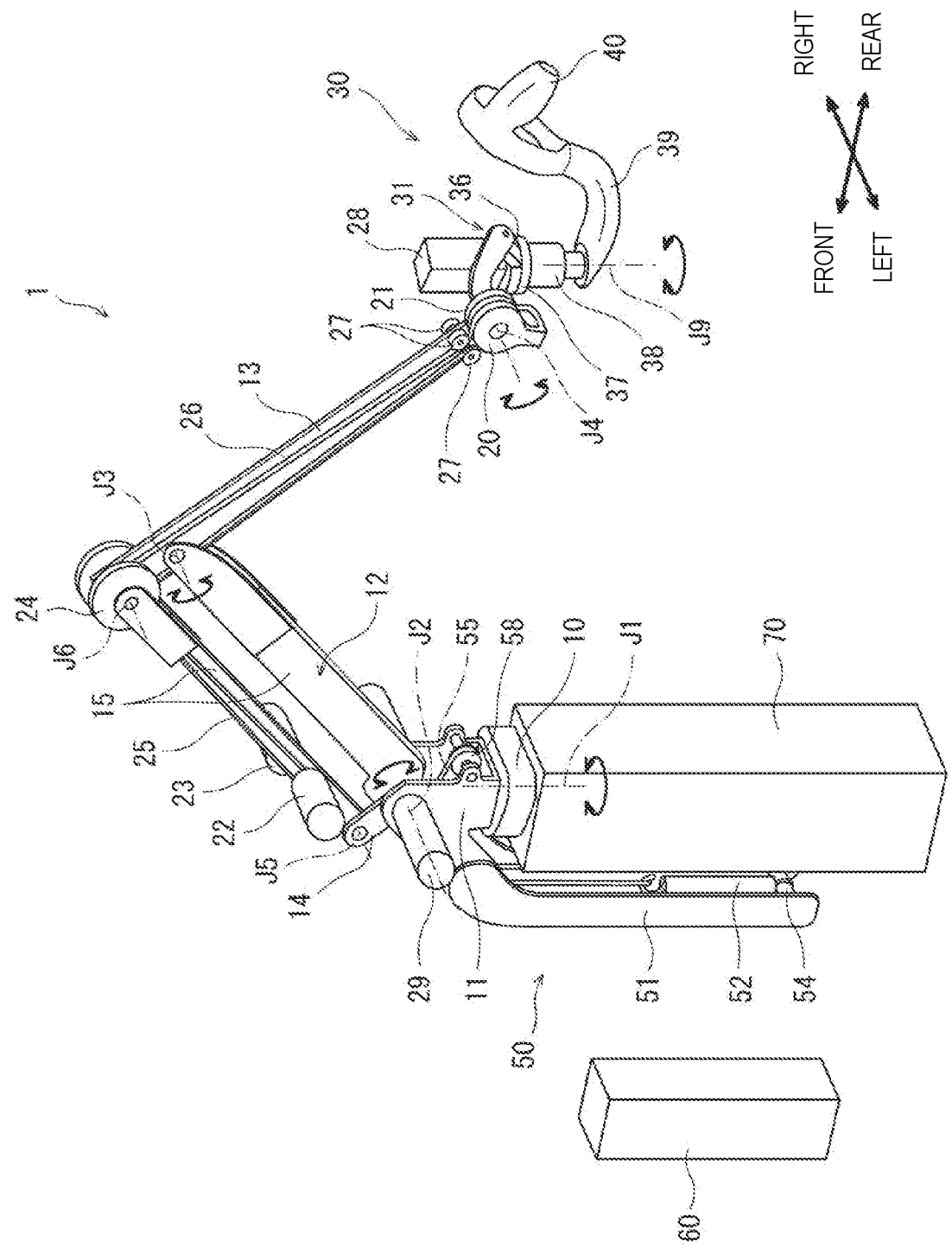
FIG. 1 is a perspective view illustrating a remote control device according to one embodiment of the present disclosure.
Figure 2:
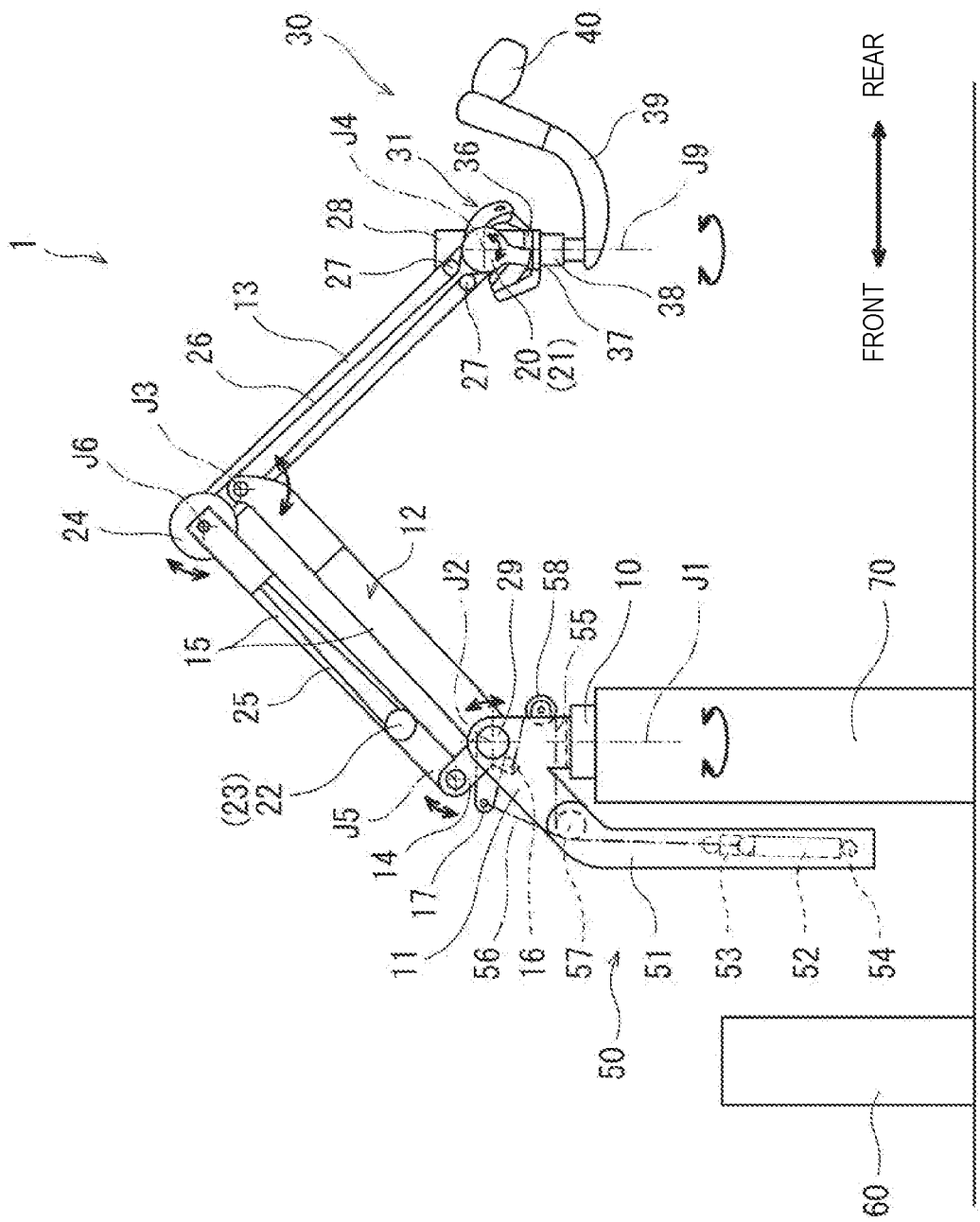
FIG. 2 is a side view of the remote control device illustrated in FIG. 1.

FIG. 1 is a perspective view illustrating the remote control device 1 according to this embodiment. FIG. 2 is a side view illustrating a configuration of the remote control device 1 illustrated in FIG. 1. In the following embodiment, one example of transmitting the motive power of the motor by using a belt is described. As for the power transmission of the motor, configurations other than the belt may also be adopted.

In the remote control device 1 of this embodiment, a base part 10 is fixed to an upper part of a pedestal 70. A support link 11 is provided to an upper part of the base part 10. The support link 11 can swivel on a rotation shaft J1 in the vertical direction, with respect to the base part 10. A base part of a first arm 12 is supported by an upper part of the support link 11. The first arm 12 is pivotable around a first pivot shaft J2 in the lateral direction provided to the support link 11. A second arm 13 is provided to a tip-end part of the first arm 12. The second arm 13 is pivotable around a second pivot shaft J3 in the lateral direction provided to the first arm 12. Two drive shafts J4 are provided coaxially in the horizontal direction to a tip-end part of the second arm 13. Each drive shaft J4 is provided to a first pulley 20 and a second pulley 21 which are two rotary bodies. At the part of the first pulley 20 and the second pulley 21, the user interface 30 is provided. The details of the first pulley 20, the second pulley 21, and the user interface 30 will be described later.

Further, the first arm 12 has two connection links 15 which are link members disposed in parallel to each other, and base part sides of the two connection links 15 are connected via a coupling link 14. The coupling link 14 is connected to the lower connection link 15 so as to be turnable about the first pivot shaft J2, and is connected to the upper connection link 15 so as to be turnable about a third pivot shaft J5. Tip-end parts of the two connection links 15 are connected to the second pivot shaft J3 of the second arm 13, and a fourth pivot shaft J6 provided with a given interval from the second pivot shaft J3. The first arm 12 is formed in a parallel link structure including the two connection links 15, the coupling link 14 and a part of the second arm 13, which are connected by the first pivot shaft J2 and the second pivot shaft J3, and the third pivot shaft J5 and the fourth pivot shaft J6, respectively.

As will be described later, a first motor 22 which makes a force-sense feedback about a pitch axis L1 act on the user interface 30, and a second motor 23 which makes a force-sense feedback about a roll axis L2 act on act on the user interface 30, are disposed on the base part side of the connection links 15, which is the base part side of the first arm 12. By disposing the two motors (the first motor 22 and the second motor 23) on the base part side of the first arm 12, the weight on the user interface 30 side (including a spherical surface parallel link 31 described later) is reduced, as compared with a case where it is disposed at the user interface 30, to reduce the moment of inertia when the user interface 30 is operated, thereby improving the operability of the user interface 30.

A middle pulley 24 is provided to the fourth pivot shaft J6. The middle pulley 24 has a configuration in which four belts are wound in the axial direction of the fourth pivot shaft J6. Two first transmission belts 25 connect between the middle pulley 24 and pulleys (not illustrated) of the first motor 22 and the second motor 23. Two second transmission belts 26 connect between the middle pulley 24, and the first pulley 20 and the second pulley 21 which are disposed side by side on the drive shafts J4. Toothed belts may be used as the transmission belts 25 and 26. By using the toothed belts, the rotation phase between the two axes can be maintained accurately. The first motor 22 has a sensor which outputs a signal of a rotation angle on the pitch axis L1 (FIG. 3) when the user interface 30 is operated. Further, the second motor 23 has a sensor which outputs a signal of a rotation angle on the roll axis L2 (FIG. 3) when the user interface 30 is operated. An encoder can be used as the sensor.

The first pivot shaft J2 which supports the base part of the first arm 12 is provided with a fourth motor 29. The fourth motor 29 makes a force-sense feedback act on the user interface 30 according to the operation of the first arm 12, and has a sensor which outputs a signal of a pivot angle of the first arm 12. An encoder can be used as the sensor.

(Configuration of User Interface)

Figure 3:
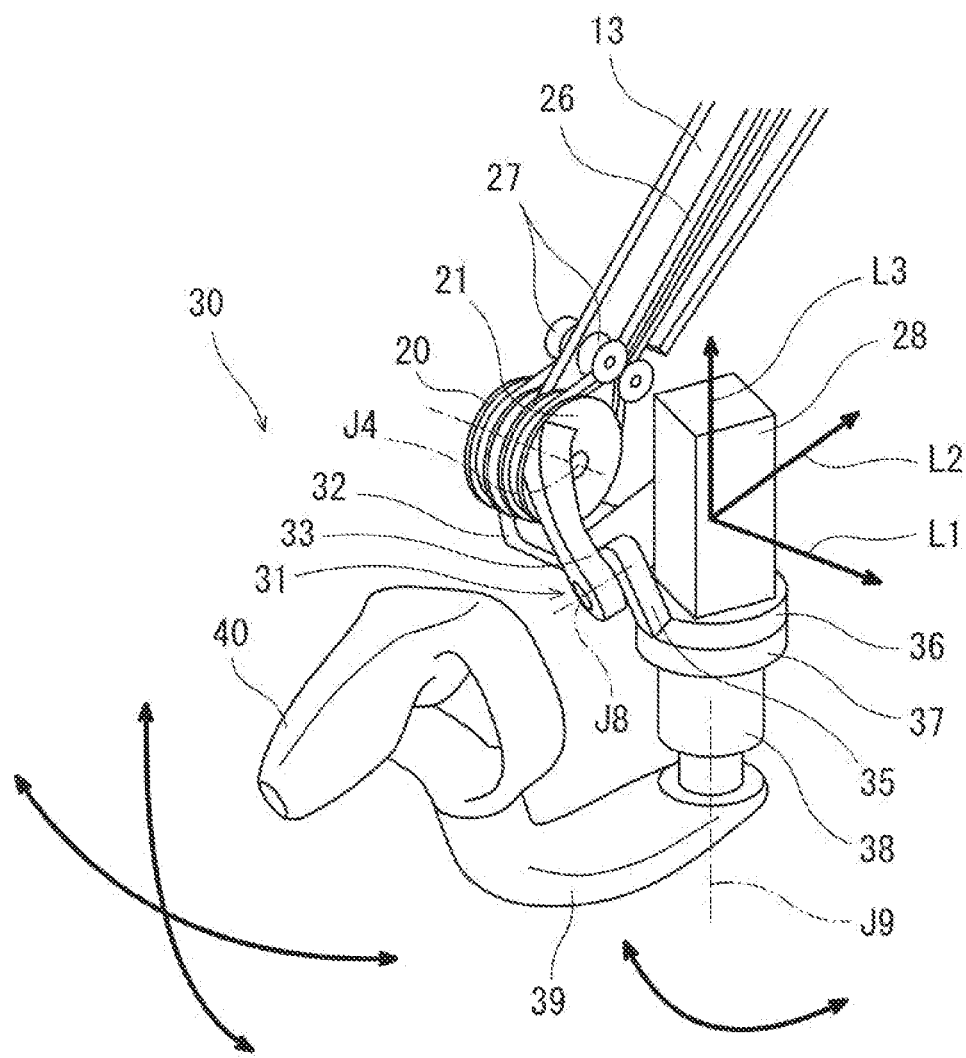
FIG. 3 is an enlarged perspective view illustrating a part of a user interface of the remote control device illustrated in FIG. 1, when seen in the opposite direction of FIG. 1.
Figure 3:
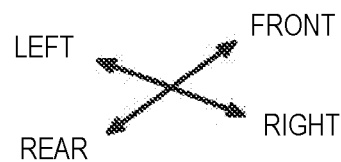
Figure 4:
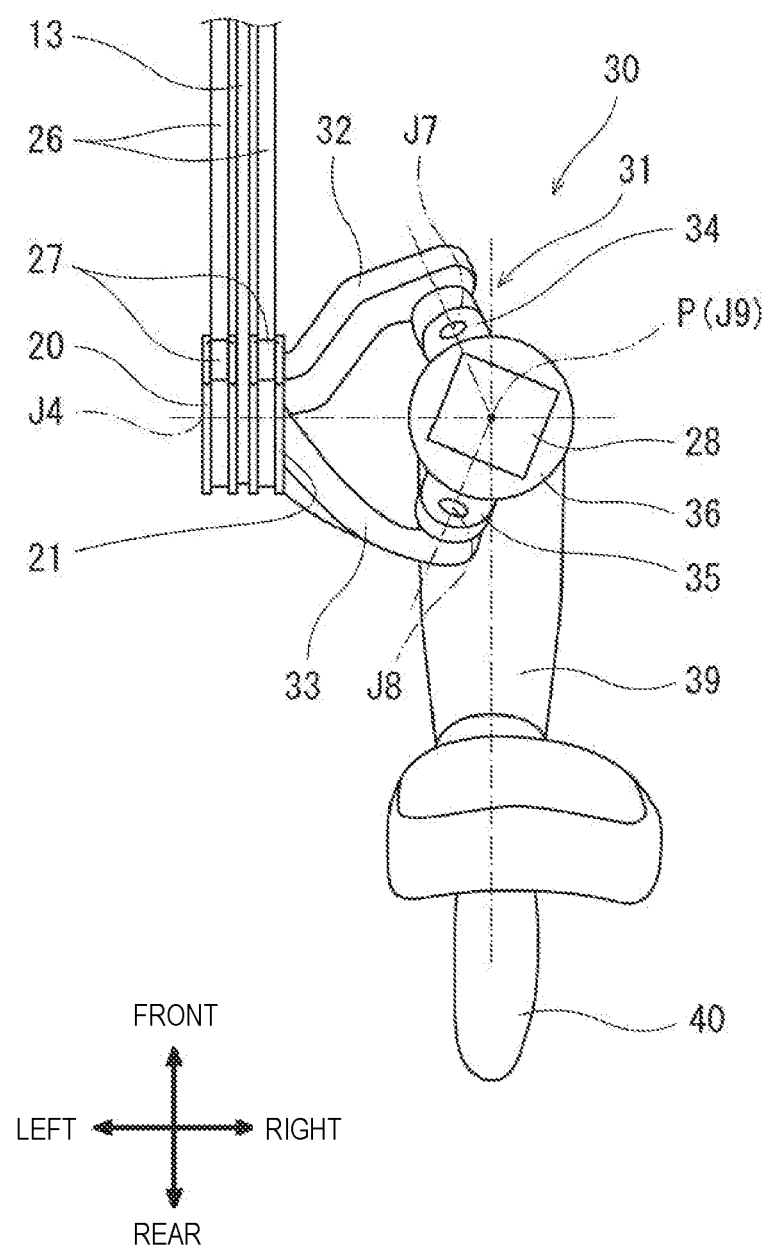
FIG. 4 is a plan view of the part of the user interface illustrated in FIG. 3.

FIG. 3 is an enlarged perspective view of the user interface 30 of the remote control device 1 illustrated in FIG. 1, when seen in the opposite direction of FIG. 1. The illustrated user interface 30 is in a state where no external force acts on the user interface 30. FIG. 4 is a plan view of the user interface 30 illustrated in FIG. 3. A configuration of the user interface 30 provided to the tip-end part of the second arm 13 is described based on these drawings.

The tip-end part of the second arm 13 is horizontally provided with the two drive shafts J4, and the first pulley 20 and the second pulley 21 are independently and rotatably supported by the respective drive shafts J4. Tension rollers 27 are provided near the first pulley 20 and the second pulley 21 so that the tension of the second transmission belt 26 is maintained.

Moreover, in this embodiment, a spherical surface parallel link 31 is provided to the side of the second pulley 21 as a link structure. The link structure may be other than the spherical surface parallel link 31, as long as it makes the user interface 30 pivotable with respect to the second arm 13 on mutually-perpendicular three axes passing through its center point P. Base parts of a first link member 32 and a second link member 33 which are the configuration of the spherical surface parallel link 31 are fixed to the first pulley 20 and the second pulley 21, respectively. On the other hand, a first bracket 36 and a second bracket 37 which constitute the spherical surface parallel link 31 are provided on the axis of a rotation shaft J9 perpendicular to the drive shafts J4, and a tip-end part of the first link member 32 is connected to a first support 34 of the first bracket 36, as a revolute pair. A tip-end part of the second link member 33 is connected to a second support 35 of the second bracket 37, as a revolute pair. This spherical surface parallel link 31 makes the user interface 30 pivotable, with respect to the second arm 13, on the perpendicular three axes (the pitch axis L1, the roll axis L2, and a yaw axis L3) passing through the center point P of the spherical surface parallel link 31. This spherical surface parallel link 31 is provided to the side of the second pulley 21 so that the center point P is located on the axes of the two drive shafts J4.

As illustrated in FIG. 4, in the spherical surface parallel link 31 of this embodiment, the centers of curvature of the first link member 32 and the second link member 33 formed in an arc shape are in agreement with each other at the center point P on the axis of the drive shafts J4. As for the first link member 32 and the second link member 33 which rotate centering on the center point P, rotation shafts J7 and J8 of the first support 34 and the second support 35, which are connected as a revolute pair at the tip ends, are also in agreement with each other at the center point P. A base part of the first link member 32 is fixed to a side surface of the first pulley 20, and a base end of the second link member 33 is fixed to a side surface of the second pulley 21. Therefore, the first link member 32 and the second link member 33 of the spherical surface parallel link 31 rotate centering on the center point P.

The user interface 30 is attached to the second bracket 37 on the axis of the rotation shaft J9 passing through the center point P of the spherical surface parallel link 31. The user interface 30 has a rotary part 38 extending downwardly from the second bracket 37, an offset arm 39 extending from the rotary part 38 so as to be curved rearward which intersects with the axis of the drive shaft L4, and a grip 40 provided to an end of the offset arm 39. Thus, a base part of the offset arm 39 is attached to the second bracket 37 of the spherical surface parallel link 31 so that the grip 40 of the user interface 30 extends in the direction which intersects with the rotation shaft J9 from the side of the second pulley 21.

A third motor 28 which makes a force-sense feedback about the yaw axis L3 act on the user interface 30 is provided to an upper surface of the first bracket 36. The third motor 28 has a sensor which outputs a signal of a rotation angle when rotating the grip 40 horizontally (a rotation angle of the rotary part 38).

According to such a user interface 30, by moving the grip 40 in the front and rear, and left and right directions as illustrated by arrows, using the spherical surface parallel link 31 where the first link member 32 and the second link member 33 are fixed to the two pulleys 20 and 21, respectively, the two pulleys 20 and 21 can be rotated in the same direction or the opposite directions, as will be described later. Further, by moving the grip 40, the second arm 13 can change the angle at the drive shaft J4 and the second pivot shaft J3, and the first arm 12 can change the pivot angle at the first pivot shaft J2. Moreover, by moving the grip 40, the support link 11 can be swiveled on the rotation shaft J1, together with the second arm 13 and the first arm 12.

According to this remote control device 1, the variations of the rotation angles on the pitch axis L1, the roll axis L2, and the yaw axis L3 when the user interface 30 is operated (including inclination and rotation) are detected by the first motor 22, the second motor 23, and the third motor 28, respectively. An electric signal acquired by operating the grip 40 of the user interface 30 is outputted to a corresponding action part of the robot as an electric signal according to the bilateral control via a control device 60 (FIGS. 1 and 2). On the other hand, the electric signal acquired by an external force received by the action part of the robot is outputted to each of the motors 22, 23, and 28 which give the force-sense feedbacks to the user interface 30 as the electric signal according to the bilateral control. The control device 60 has a processor, a volatile memory, a nonvolatile memory, an I/O interface, etc. The control device 60 outputs the electric signal according to the bilateral control based on the inputted electric signal. The outputted electric signal is obtained by the processor carrying out a calculation using the volatile memory based on a program stored in the nonvolatile memory so that it becomes a signal according to the bilateral control with respect to the inputted electric signal.

In addition, according to the remote control device 1 of this embodiment, the first motor 22 which makes the force-sense feedback about the pitch axis L1 act on the user interface 30, and the second motor 23 which makes the force-sense feedback about the roll axis L2 act on the user interface 30 are provided to the base part side of the first arm 12. Thus, the weight on the user interface 30 side can be reduced by disposing the first motor 22 and the second motor 23 which are heavy objects on the base part side of the first arm 12 which is away from the user interface 30, thereby improving the operability of the user interface 30.

In addition, according to the remote control device 1 of this embodiment, by supporting the user interface 30 provided to the tip-end part of the second arm 13 by the spherical surface parallel link 31 which is not provided in the tip-end direction which is the extending direction of the second arm 13, but provided to the side, the distance from the tip-end part of the second arm 13 to the grip 40 can be shortened, and a large operating range of the user interface 30 can be secured, while forming the user interface 30 compactly. That is, according to the remote control device 1 of this embodiment, the user interface 30 is supported by the spherical surface parallel link 31 provided to the side of the second pulley 21 so that the grip 40 is offset from the first pulley 20 and the second pulley 21 by a given distance. Therefore, the configuration around the grip 40 can be made compact, and the operability can be improved with an expanded operating range where the operation about the yaw axis L3 for operating a wrist part of the robot is about 180° rightward and about 90° leftward.

Note that the user interface 30 of this embodiment is provided with the grip 40 so that it is operated with a single hand, but the user interface 30 is not limited to this embodiment and it may be configured to be operated with both hands.

(Configuration of Self-weight Compensator)

Figure 5:
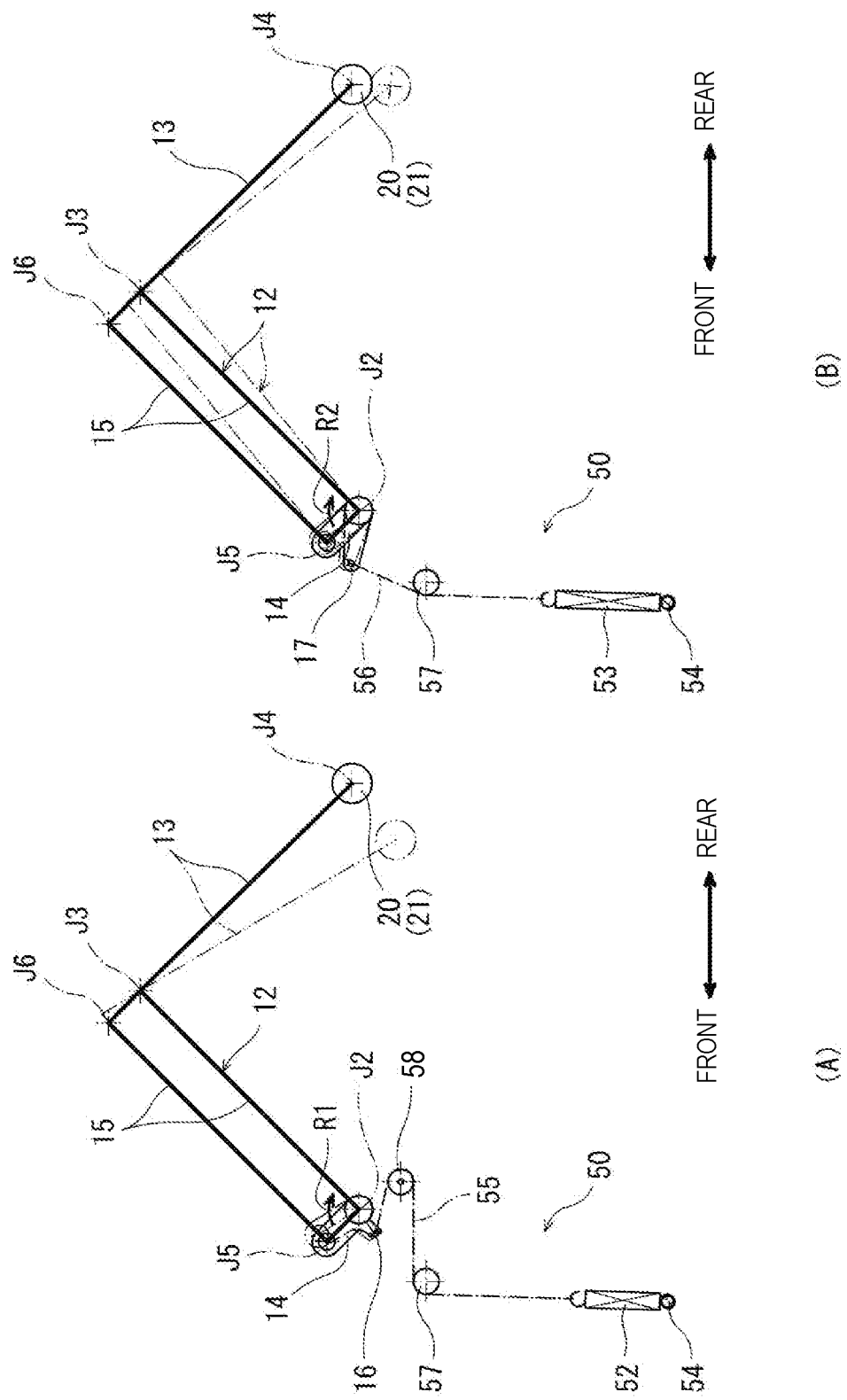
FIGS. 5(A) and 5(B) are structural charts schematically illustrating a self-weight compensator of the remote control device illustrated in FIG. 2.

FIGS. 5(A) and 5(B) are structural charts schematically illustrating a self-weight compensator 50 of the remote control device 1 illustrated in FIG. 2.

The self-weight compensator 50 is a configuration for balancing the weight. The entire configuration of the self-weight compensator 50 is described based on FIG. 2, and it is concretely described based on FIGS. 5(A) and 5(B). Note that, in FIGS. 5(A) and 5(B), only the configuration of each self-weight compensator is illustrated.

As illustrated in FIG. 2, the remote control device 1 of this embodiment is provided with the self-weight compensator 50 which extends in the up-and-down direction along the pedestal 70. The self-weight compensator 50 is provided at the opposite direction from the extending direction of the first arm 12 with respect to the support link 11. The self-weight compensator 50 has a pair of frame members 51 provided to the support link 11, and a first coil spring 52 and a second coil spring 53 which are spring members provided between the pair of frame members 51. The frame members 51 are a pair of plate members which are fixed at upper end parts to the support link 11, and extend downwardly along the pedestal 70. The first coil spring 52 and the second coil spring 53 are supported at lower end parts by a spring support shaft 54 which is fixed between the frame members 51, and are connected at upper end parts to a first wire 55 and a second wire 56, respectively. The first wire 55 and the second wire 56 are wound around two first rollers 57 provided to upper parts of the frame members 51, and ends of the wires then extend toward the base part of the first arm 12.

As illustrated in FIG. 5(A), the first wire 55 connected to the upper end part of the first coil spring 52 is wound around the first roller 57, and then extends rearward of the support link 11. Further, it is wound around a second roller 58 provided to a rear part of the support link 11 and extends forward, and is connected to a first connecting member 16 provided to a front part of the coupling link 14. The first coil spring 52 and the first wire 55 use a spring force of the first coil spring 52 to compensate the self-weight in a direction of an arrow R1 which acts around the first pivot shaft J2, when the second arm 13 inclines to the first arm 12, as illustrated by two-dot chain lines.

As illustrated in FIG. 5(B), the second wire 56 connected to the upper end part of the second coil spring 53 is wound around the first roller 57, and is then connected to a second connecting member 17 provided forward centering on the first pivot shaft J2 so that it pivots integrally with the first arm 12. The second coil spring 53 and the second wire 56 use a spring force of the second coil spring 53 to compensate the self-weight in a direction of an arrow R2 which acts around the first pivot shaft J2, when the first arm 12 and the second arm 13 incline, as illustrated by two-dot chain lines. The self-weight compensator 50 is in a state where the self-weight compensation by the first coil spring 52 and the second coil spring 53 always works, and therefore, the self-weight compensation is appropriately carried out according to the inclination of each of the first arm 12 and the second arm 13.

In this self-weight compensator 50, the first coil spring 52 and the second coil spring 53 are disposed so as to extend along the pedestal 70 so that the spring force of each of the coil springs 52 and 53 is used as a force according to the weight acting on the spring and a distance from the first pivot shaft J2.

According to such a self-weight compensator 50, the first arm 12 and the second arm 13 can be maintained in the state illustrated in FIG. 2 when no external force acts on the user interface 30. Further, since such a self-weight compensator 50 is disposed so as to extend in the up-and-down direction along the pedestal 70 on the opposite side of the extending directions of the first arm 12 and the second arm 13, the turning radius and the moment of inertia can be reduced, and the grip 40 of the user interface 30 can be operate lightly.

Although in this embodiment the coil spring is used as the configuration of the self-weight compensator 50 for compensating the self-weight of the arm, the configuration for compensating the self-weight may also use a hydraulic damper etc.

(Example Operation of Remote Control Device)

Figure 6:
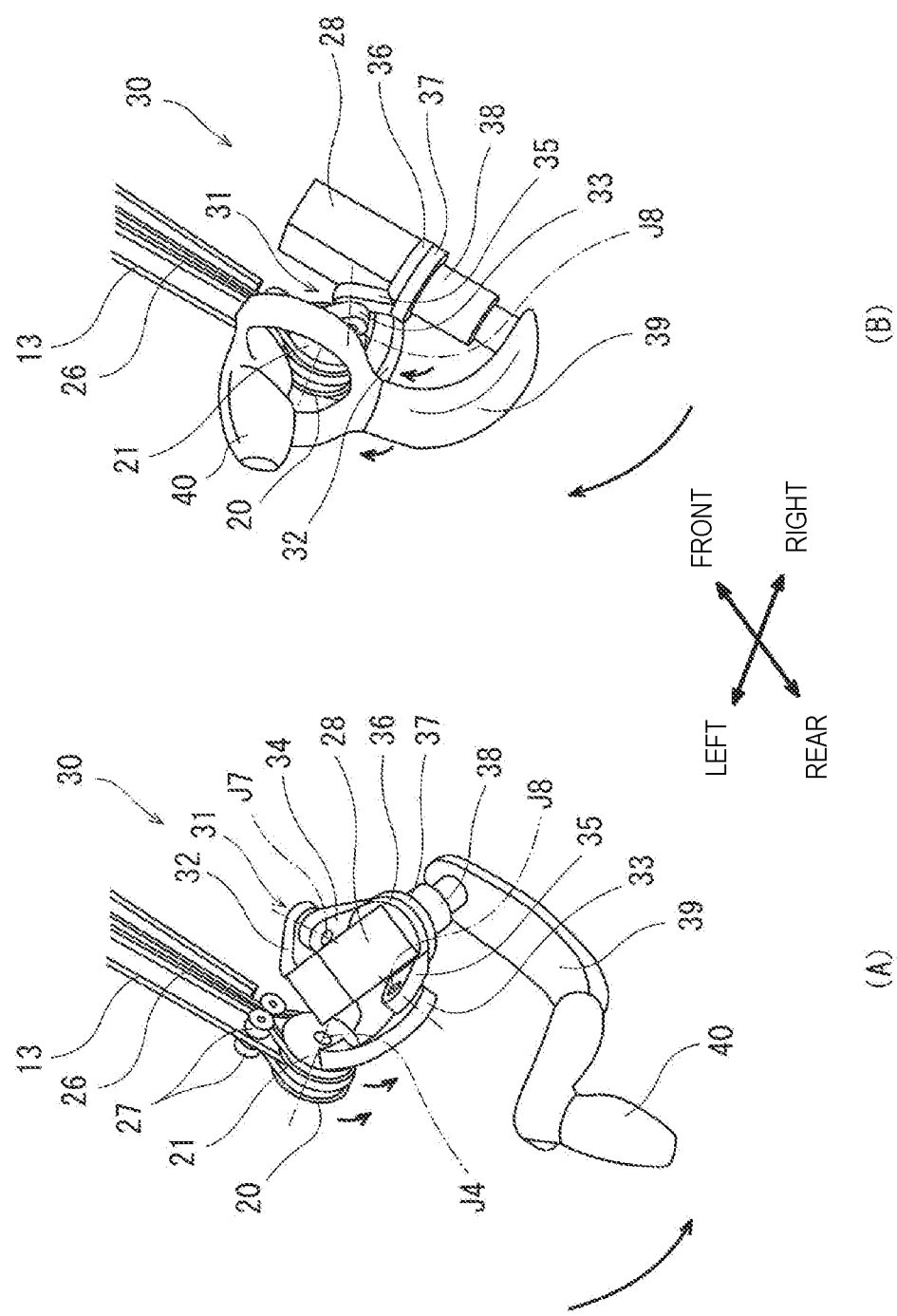
FIGS. 6(A) and 6(B) are views illustrating a state where the user interface illustrated in FIG. 3 is leaned in the front-and-rear direction, where

FIGS. 6(A) and 6(B) are views illustrating a state where the user interface 30 illustrated in FIG. 3 is leaned in the front-and-rear direction, where FIG. 6(A) is a perspective view of a state where it is leaned forward, and FIG. 6(B) is a perspective view of a state where it is leaned rearward. FIGS. 7(A) and 7(B) are views illustrating a state where the user interface 30 illustrated in FIG. 3 is leaned in the left-and-right direction, where FIG. 7(A) is a perspective view of a state where it is leaned leftward, and FIG. 7(B) is a perspective view of a state where it is leaned rightward. FIG. 8 is a plan view illustrating a state where the user interface 30 illustrated in FIG. 3 is rotated horizontally. In the following example, a case where the wrist part of the robot (not illustrated) is operated is described as an example.

As illustrated in FIG. 6(A), when the grip 40 of the user interface 30 is leaned forward, the rear parts of the first pulley 20 and the second pulley 21 are rotated downwardly by the same angle, together with the first bracket 36 and the second bracket 37 of the spherical surface parallel link 31. Therefore, the wrist part of the robot which is remotely controlled can be leaned so that the front part rotates upwardly.

On the other hand, as illustrated in FIG. 6(B), when the grip 40 of the user interface 30 is leaned rearward, the rear parts of the first pulley 20 and the second pulley 21 are rotated upwardly by the same angle, together with the first bracket 36 and the second bracket 37 of the spherical surface parallel link 31.

Therefore, the wrist part of the robot which is remotely controlled can be leaned so that the front parts rotate downwardly.

Since the user interface 30 is provided to the side of the second pulley 21 by the spherical surface parallel link 31, the operation of rotating the grip 40 of the user interface 30 in the front-and-rear direction can be performed with a large rotation angle, without contacting the second pulley 21, the first pulley 20, etc. Therefore, also at the wrist part of the robot, the front part can be operated greatly in the up-and-down direction.

Further, the force received by the wrist part of the robot according to this operation is force-sense fed back to the first pulley 20 and the second pulley 21 via the transmission belts 25 and 26 and the middle pulley 24 by the first motor 22 and the second motor 23 which are provided to the base part side of the connection link 15, as the forces in the same direction. This force-sense feedback is transmitted to the user interface 30 via the spherical surface parallel link 31 coupled to the first pulley 20 and the second pulley 21.

Figure 7:
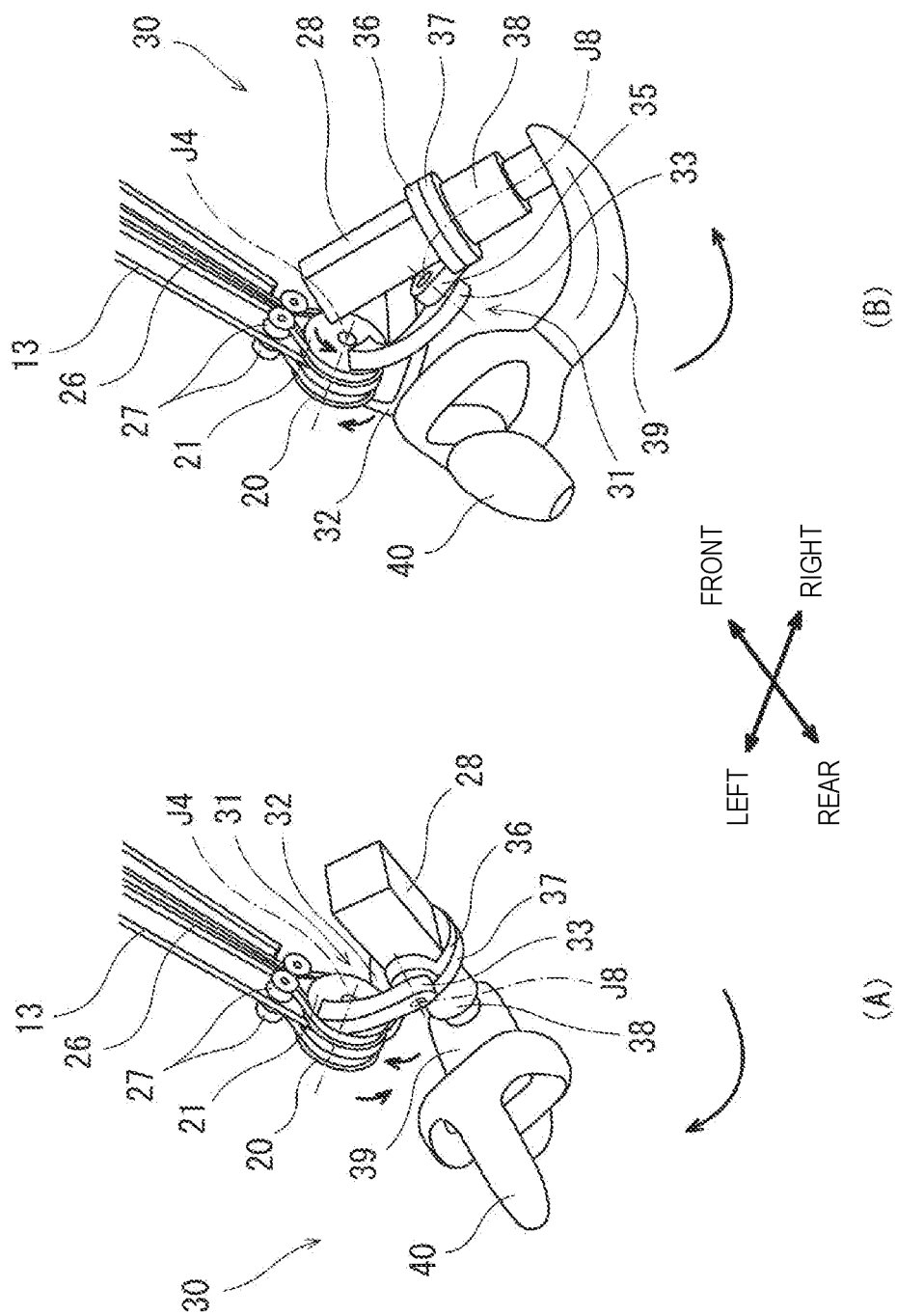
FIGS. 7(A) and 7(B) are views illustrating a state where the user interface illustrated in FIG. 3 is leaned in the left-and-right direction, where
Figure 8:
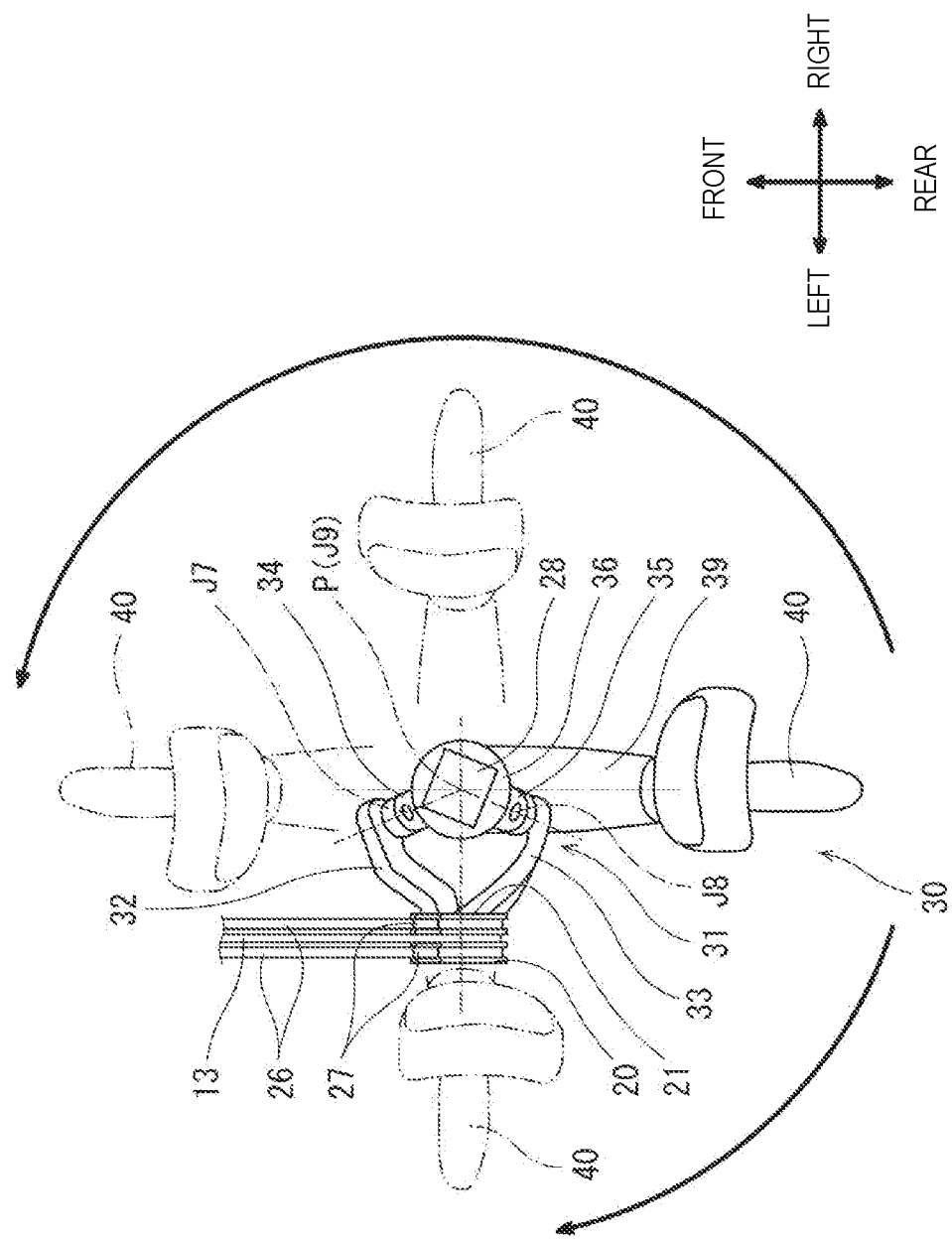
FIG. 8 is a plan view illustrating a state where the user interface illustrated in FIG. 3 is rotated horizontally.

As illustrated in FIG. 7 (A), when the grip 40 of the user interface 30 is leaned leftward, the rotation shaft J8 of the second link member 33 and the second support 35 of the spherical surface parallel link 31 moves upward, and the base part of the second link member 33 moves upward to rotate the rear part of the second pulley 21 upward. On the other hand, the rotation shaft J7 (FIG. 4) of the first link member 32 and the first support 34 of the spherical surface parallel link 31 moves downwardly, and the base part of the first link member 32 moves downward to rotate the rear part of the first pulley 20 downward. Therefore, the wrist part of the robot which is remotely controlled can be leaned to the left. The force received by the wrist part of the robot according to this operation is force-sense fed back to the first pulley 20 and the second pulley 21 via the transmission belts 25 and 26 and the middle pulley 24 by the first motor 22 and the second motor 23 provided to the base part side of the connection link 15 (the base part side of the first arm 12) as a force in the direction of reaction force. This force-sense feedback is transmitted to the user interface 30 via the spherical surface parallel link 31 coupled to the first pulley 20 and the second pulley 21.

On the other hand, as illustrated in FIG. 7 (B), when the grip 40 of the user interface 30 is leaned rightward, the rotation shaft J8 of the second link member 33 and the second support 35 of the spherical surface parallel link 31 moves downwardly, and the base part of the second link member 33 moves downward to rotate the rear part of the second pulley 21 downward. On the other hand, the rotation shaft J7 (FIG. 4) of the first link member 32 and the first support 34 of the spherical surface parallel link 31 moves upward, and the base part of the first link member 32 moves upward to rotate the rear part of the first pulley 20 upward. Therefore, the wrist part of the robot which is remotely controlled can be leaned to the right. The force received by the wrist part of the robot according to this operation is force-sense fed back to the first pulley 20 and the second pulley 21 by the first motor 22 and the second motor 23 which are provided on the base part side of the connection link 15 (the base part side of the first arm 12) as the force in the direction of reaction force. This force-sense feedback is transmitted to the user interface 30 via the spherical surface parallel link 31 coupled to the first pulley 20 and the second pulley 21.

As illustrated in FIG. 8, when the grip 40 of the user interface 30 is horizontally rotated to the right, the user interface 30 can be rotated rightward centering on the rotary part 38 (FIG. 3) provided on the axis of the rotation shaft J9. Further, when the grip 40 of the user interface 30 is horizontally rotated to the left, the user interface 30 can be rotated leftward centering on the rotary part 38 (FIG. 3) provided on the axis of the rotation shaft J9. The rotation of the grip 40 to the right can be made in a large range of about 180°. Since the grip 40 of the user interface 30 is offset by a given distance from the center point P of the spherical surface parallel link 31, the rotation of the grip 40 to the left can be made in a large range of about 90°, without contacting the pulleys 20 and 21. When rotating the grip 40 of the user interface 30 horizontally, only the user interface 30 can be rotated, while maintaining the position and the angle of the first arm 12 and the second arm 13. Therefore, the wrist part of the robot can appropriately be rotated in the horizontal direction. The force received by the wrist part of the robot according to this operation is force-sense fed back to the user interface 30 by the third motor 28 provided to the first bracket 36 of the spherical surface parallel link 31 as the force in the direction of reaction force.

In addition, in this embodiment, as illustrated in FIG. 2, the first motor 22 and the second motor 23 which make the force-sense feedbacks in the direction of the pitch axis L1 and the direction of the roll axis L2 act on the user interface 30 are provided to the base part side of the first arm 12 (the base part side of the connection link 15). Therefore, while suppressing the increase in the weight of the user interface 30, the weight on the user interface 30 side of the first arm 12 and the second arm 13 which pivot at the base part side of the first arm 12 as the fulcrum can be reduced. Moreover, since the first arm 12 and the second arm 13 can be maintained at a given angle by the self-weight compensator 50, the state of the user interface 30 can be maintained.

Therefore, the burden of controlling while holding the grip 40 of the user interface 30 can be reduced, and operator's burden can be reduced even if it is a long period operation.

Although in the above embodiment the actuators which make the force-sense feedbacks act on the user interface 30 are the motors 22, 23, and 28, they are not limited to the above embodiment, and the actuators may be other than the motors 22, 23, and 28.

(Use etc. of Remote Control Device)

The remote control device 1 described above can remotely control, for example, an articulated robot which performs a slag scraping work, and civil engineering machinery which scoops earth and sand, etc. Since the slag scraping work is a work, in the process of manufacturing a cast product, for taking out and removing slag (impurities, such as slag and oxide) from a molten metal surface of molten metal material, the hard work at high temperature is required, thus, the work by a robot is considered. According to the remote control device 1 described above, such a slag scraping work can also be remotely controlled by operating the user interface 30 with the expanded operating range at a location distant from the robot. In addition, since the configuration around the user interface 30 is compact, the long-period work can also be performed appropriately.

Further, the remote control device 1 described above can also be used in a case where a worker cannot directly control the civil engineering machinery, such as a shovel vehicle, and it can operate the user interface 30 in the expanded operating range to remotely control a scooping work of earth and sand etc. Note that the application of the remote control device 1 is not limited to those described above.

Further, the above embodiment illustrates one example, various configurations may be changed without departing from the scope of the present disclosure, and the present disclosure is not limited to the above embodiment.

Moreover, the link structure may include the spherical surface parallel link. According to such a configuration, the user interface can easily be turnable about the three axes of the pitch axis, the roll axis, and the yaw axis, which pass through the center point.

Further, the spherical surface parallel link may include the first link member and the second link member which rotate centering on the center point, the brackets including the first support and the second support which are connected to the tip ends of the first link member and the second link member, respectively, as a revolute pair. The base ends of the first link member and the second link member may be fixed to the two rotary bodies, respectively.

According to such a configuration, by the spherical surface parallel link including the first link member and the second link member which are fixed to the two rotary bodies, respectively, the two rotary bodies can appropriately be rotated in the same direction or the opposite directions with the operation of the user interface.

Further, the first arm may be supported by the support link that is disposed to the base part so as to be turnable about the rotation shaft, and the second arm may be connected to the tip-end part of the first arm via the pivot shaft disposed in parallel to the drive shafts. According to such a configuration, by the pivot shaft disposed in parallel to the drive shafts, the second arm can appropriately be turned with respect to the first arm, with the operation of the user interface.

The first arm may have the two link members disposed in parallel. The actuators for exerting, on the user interface, force-sense feedbacks about the pitch axis, the roll axis, and the yaw axis, may be provided. The actuators which exert, on the user interface, the force-sense feedbacks about the pitch axis and the roll axis via the rotary body may be disposed at the base part side of the first arm. According to such a configuration, the actuators which are heavy objects are disposed at the base part side of the first arm, and the weight of the tip-end side of the first arm, the part of the second arm, and the user interface can be reduced, thereby improving the operability of the user interface.

Further, the rotary body may include a pulley, the middle pulley may be disposed at the tip-end part of the first arm, and the transmission belts may connect between the actuator and the middle pulley, and between the middle pulley and the pulleys. According to such a configuration, the configuration for transmitting the force-sense feedbacks about the roll axis and the pitch axis to the user interface from the actuators disposed at the base part side of the first arm may be simply include the pulleys and the belts. Therefore, the simplification of the configuration and the reduction in the cost of the remote control device can be achieved.

Further, the actuator which gives the force-sense feedback about the yaw axis may be included in the link structure. According to such a configuration, the actuator which exerts, on the user interface, the force-sense feedback about the yaw axis can be included in the link structure, and thus, the force-sense feedback can be exerted appropriately.

Further, the pedestal which fixes the base part may be provided, and the self-weight compensator which compensates the self-weights of the first arm and the second arm may be provided along the pedestal. According to such a configuration, the self-weight compensator which compensates the self-weight of the first arm which extends from the base part and the self-weight of the second arm may have a small turning radius along the pedestal, and therefore, the moment of inertia can be reduced, and the operability of the user interface can be improved.

Further, the self-weight compensator may include the spring member disposed so as to extend along the pedestal. According to such a configuration, the self-weight compensation of the first arm and the second arm can appropriately be performed by the spring member with the simple structure.

The invention claimed is:

1. A remote control device, comprising:
a first arm supported by a base part;
a second arm connected to a tip-end part of the first arm;
two rotary bodies disposed side by side at a tip-end part of the second arm;
a link structure in which link members are fixed to the two rotary bodies, respectively; and
a user interface attached to the link structure,
wherein the two rotary bodies are independently and rotatably supported by respective coaxial drive shafts disposed horizontally,
wherein the user interface is pivotable with respect to the second arm on each of mutually-perpendicular three axes passing through a center point of the link structure,
wherein the link structure is disposed at a lateral side of the rotary bodies so that the center point is located on an axis of the two drive shafts, wherein the link structure comprises:
a first link member connected to a first rotary body of the rotary bodies a base of the first link member directly connecting to an off-center portion of a first outward facing side surface of the first rotary body spaced apart from and not connected to the respective coaxial drive shaft thereof;
a second link member connected to a second rotary body of the rotary bodies, a base of the second link member directly connecting to an off-center portion of a second outward facing side surface of the second rotary body opposite the first outward facing side surface. and spaced apart from and not connected to the respective coaxial drive shaft thereof;
a first bracket that is connected to the first link member, is located on an axis of a rotation shaft passing through the center point, and rotates about the rotation shaft; and
a second bracket that is connected to the second link member, is located on the axis of the rotation shaft, and rotates about the rotation shaft, and wherein the user interface comprises:
an offset arm that is connected to the second bracket, on the axis of the rotation shaft, on an opposite side of the link structure from the center point, rotates about the rotation shaft, and extends in a direction which is oriented away from the axis of the rotation shaft and intersects with the axis of the rotation shaft; and
a grip extending from the offset arm in a direction which is oriented away from the axis of the rotation shaft.

2. The remote control device of claim 1, wherein the first link member and the second link member of the link structure comprise a configuration as a spherical surface parallel link.

3. The remote control device of claim 2, wherein the first link member and the second link member rotate centering on the center point, and the first bracket and the second bracket including a first support and a second support that are connected to tip ends of the first link member and the second link member, respectively, as a revolute pair.

4. The remote control device of claim 1, wherein the first arm is supported by a support link that is disposed to the base part so as to be turnable about a rotation shaft, and
wherein the second arm is connected to the tip-end part of the first arm via a pivot shaft disposed parallel to the drive shafts.

5. The remote control device of claim 4, wherein the first arm has two link members disposed in parallel to each other, wherein the remote control device further comprises actuators that exert, on the user interface, force-sense feedbacks about a pitch axis, a roll axis, and a yaw axis, and
wherein pitch and roll actuators of the actuators that exert, on the user interface, the force-sense feedbacks about the pitch axis and the roll axis via the rotary bodies are disposed at a base part side of the first arm.

6. The remote control device of claim 5, wherein each of the first rotary body and the second rotary body of the rotary bodies includes a pulley,
wherein the remote control device further comprises a middle pulley at the tip-end part of the first arm, and
wherein transmission belts connect between the pitch and roll actuators and the middle pulley, and between the middle pulley and the pulleys.

7. The remote control device of claim 5, wherein the actuator that gives the force-sense feedback about the yaw axis is included in the link structure.

8. The remote control device of claim 1, comprising:
a pedestal that fixes the base part; and
a self-weight compensator that is disposed along the pedestal and compensates self-weights of the first arm and the second arm.

9. The remote control device of claim 8, wherein the self-weight compensator includes a spring member disposed so as to extend along the pedestal.

* * * * *